W. F. KENNEY.
FRICTIONAL LOCK NUT.
APPLICATION FILED NOV. 22, 1909.

954,304.

Patented Apr. 5, 1910.

WITNESSES.
Wallace C. Parsons.
Chas. E. Smith.

INVENTOR
William F. Kenney
per S. Scholfield.
ATTORNEY

UNITED STATES PATENT OFFICE.

WILLIAM F. KENNEY, OF PROVIDENCE, RHODE ISLAND.

FRICTIONAL LOCK-NUT.

954,304.     Specification of Letters Patent.     Patented Apr. 5, 1910.

Application filed November 22, 1909. Serial No. 529,475.

*To all whom it may concern:*

Be it known that I, WILLIAM F. KENNEY, a citizen of the United States, residing at Providence, in the State of Rhode Island, have invented a new and useful Improvement in Frictional Lock-Nuts, of which the following is a specification.

The nature of my invention consists in a nut provided with opposite axially directed ribs extending along the wall of the bore, and having upon the said ribs a series of slightly eccentric screw threads, whereby the nut will be caused to move in one direction upon the bolt with greater frictional resistance than in the other.

Figure 1:
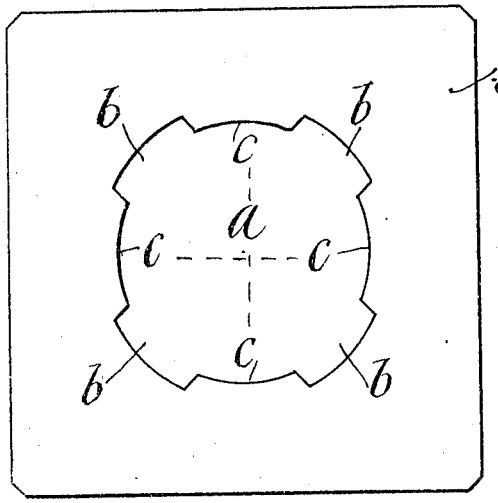
Figure 2:
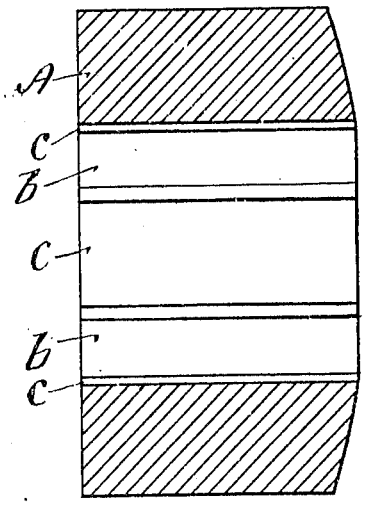
Figure 3:
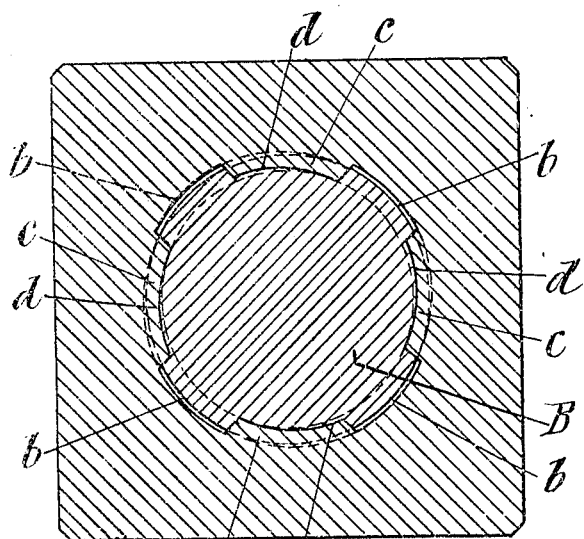
Figure 4:
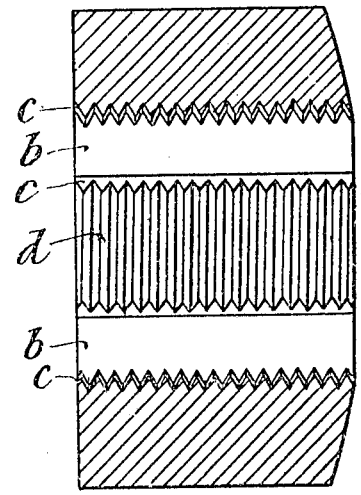

In the accompanying drawing:—Figure 1 represents the face view of a nut blank adapted for carrying out my invention. Fig. 2 represents an axial section of the same. Fig. 3 represents a transverse section of a finished nut provided with eccentric screw threads embodying my invention, and of the bolt upon which the nut is held. Fig. 4 represents an axial section of the nut.

In the drawing, A represents a nut blank provided with a central perforation $a$, having at its sides the opposite grooves $b$, $b$, and $b$, $b$, and the opposite ridges $c$ $c$, and $c$ $c$, the said ridges being adapted for the reception of screw threads as shown in Figs. 3 and 4. The screw threads $d$, $d$, as shown in Fig. 3 are made slightly eccentric whereby the nut will be caused to encounter a greater degree of frictional resistance when being moved upon the bolt B in one direction than when moved in the other, so that when properly screwed up on the bolt there will be no inherent tendency to get loose. I have preferred to provide the nuts with such eccentric threads by cutting the same in a properly constructed lathe when the nuts are of large size, and by the use of a screw tap having a number of rows of screw threads one greater than that of the ridges $c$, $c$, of the bore of the nut, whereby the tap will be caused to have a slight degree of vibration when being used to tap the threads.

I claim as my invention:—

A frictional lock-nut, having opposite axially directed grooves extending along the walls of the bore of the nut, and having the screw threads on the intermediate ridges, made slightly eccentric, whereby the nut may be caused to move backward upon the bolt with greater frictional resistance than to move forward.

WILLIAM F. KENNEY.

Witnesses:
   SOCRATES SCHOLFIELD,
   CHAS. E. SMITH.